United States Patent
Wakamiya et al.

(10) Patent No.: US 8,677,156 B2
(45) Date of Patent: Mar. 18, 2014

(54) IMAGE FORMING APPARATUS

(75) Inventors: Hidehiro Wakamiya, Numazu (JP); Marehiko Hirajima, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 583 days.

(21) Appl. No.: 12/893,508

(22) Filed: Sep. 29, 2010

(65) Prior Publication Data
US 2011/0080605 A1    Apr. 7, 2011

(30) Foreign Application Priority Data
Oct. 1, 2009   (JP) .................................. 2009-230030

(51) Int. Cl.
*G06F 1/26* (2006.01)
*G06F 1/32* (2006.01)

(52) U.S. Cl.
USPC ........... 713/300; 713/310; 713/320; 713/323; 315/291; 315/307

(58) Field of Classification Search
USPC ........... 713/300, 310, 320, 323; 315/291, 307
See application file for complete search history.

(56) References Cited

U.S. PATENT DOCUMENTS

| | | | |
|---|---|---|---|
| 2004/0037584 A1* | 2/2004 | Takahashi et al. | 399/100 |
| 2008/0198402 A1* | 8/2008 | Azuma et al. | 358/1.15 |
| 2009/0261757 A1* | 10/2009 | Wu et al. | 315/307 |

FOREIGN PATENT DOCUMENTS

| | | |
|---|---|---|
| JP | 2004-009401 A | 1/2004 |
| JP | 2004-320333 A | 11/2004 |
| JP | 2008-17114 A | 1/2008 |
| JP | 2009-37208 A | 2/2009 |

OTHER PUBLICATIONS

Office Action dated Jul. 30, 2013, in Japanese Application No. 2009-230030.

* cited by examiner

*Primary Examiner* — Kim Huynh
*Assistant Examiner* — Michael J Brown
(74) *Attorney, Agent, or Firm* — Fitzpatrick, Cella, Harper & Scinto

(57) ABSTRACT

An image forming apparatus includes an image controller that performs processing of input image information, an engine controller into which a first processing part and a second processing part are combined, and a power supply that supplies power to the engine controller. A mode of the image forming apparatus is switchable from a first mode that is a state of image formation or a stand-by state, to a second mode whose power consumption is smaller than a power consumption of the first mode. In addition, a switch unit switches between the first mode in which power is supplied to the second processing part from the power supply. The image controller and the first processing part communicate with each other through the second processing part in the first mode, or the image controller and the first processing part communicate with each other through a communication line but not through the second processing part in the second mode. In the second mode the first processing part controls the switch unit to start supplying power to the second processing part when the image controller orders transition from the second mode to the first mode through the communication line.

16 Claims, 17 Drawing Sheets

FIG. 5B ⊙ COMMAND FROM IMAGE CONTROLLER TO CPU IN THE CASE OF TRANSITION FROM POWER-SAVING MODE TO NORMAL MODE
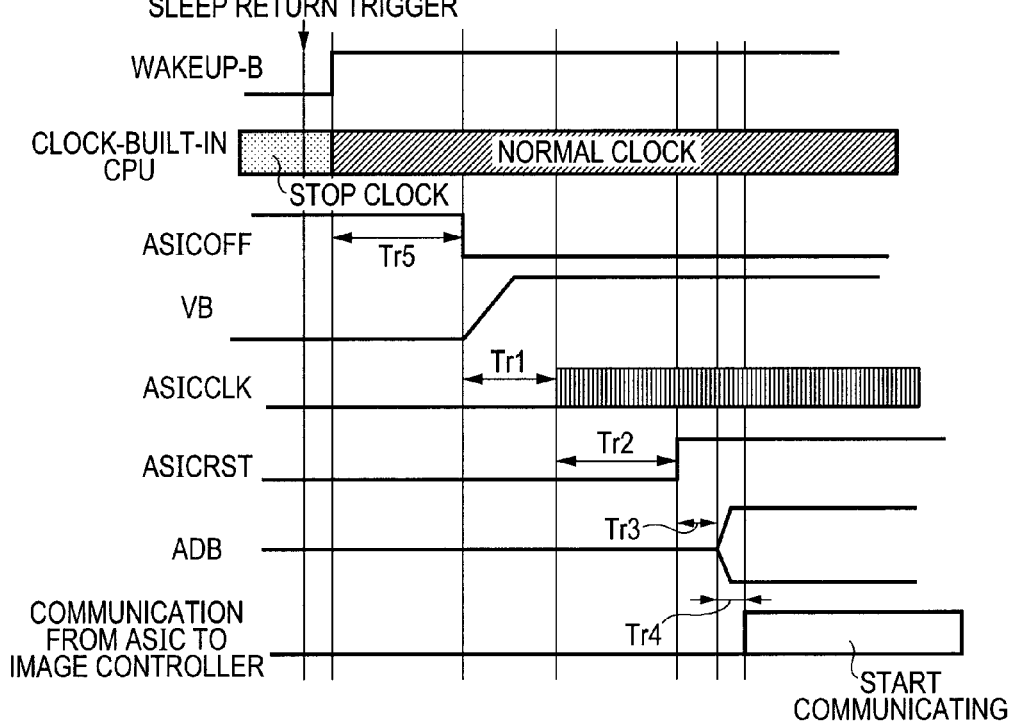
FIG. 5C ⊙ COMMAND FROM CPU TO IMAGE CONTROLLER FROM POWER-SAVING MODE TO NORMAL MODE
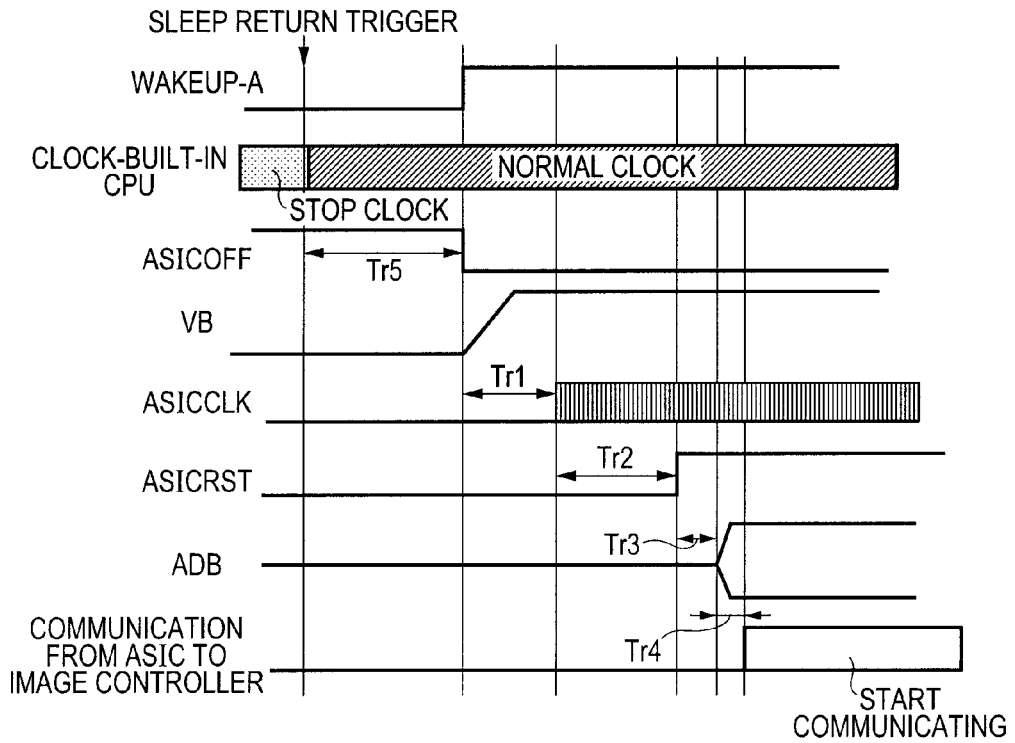

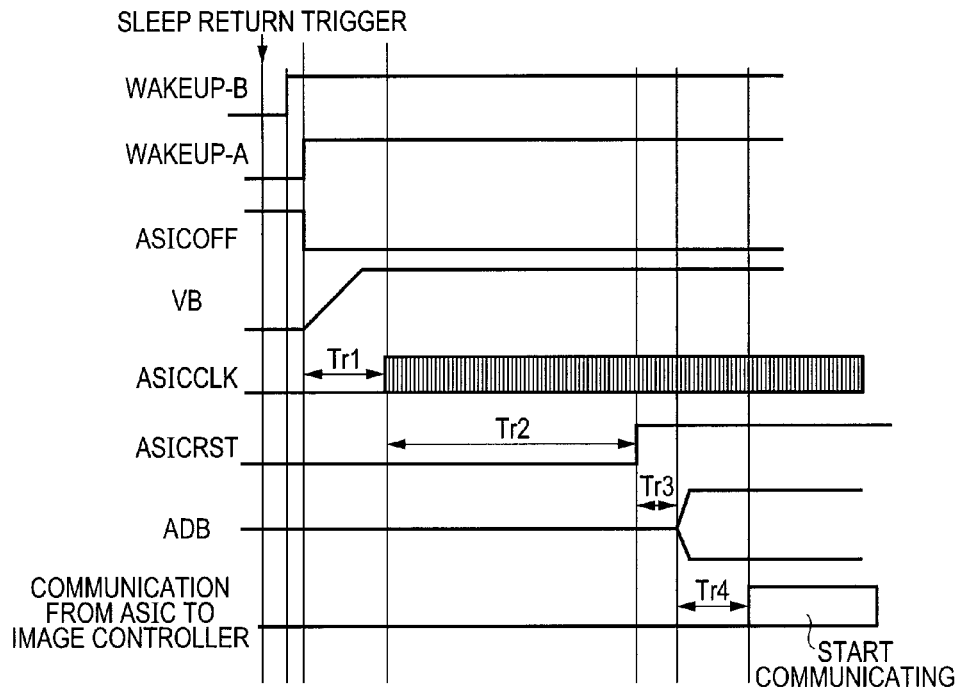
FIG. 8A ⊙ COMMAND FROM IMAGE CONTROLLER TO CPU IN THE CASE OF TRANSITION FROM POWER-SAVING MODE TO NORMAL MODE
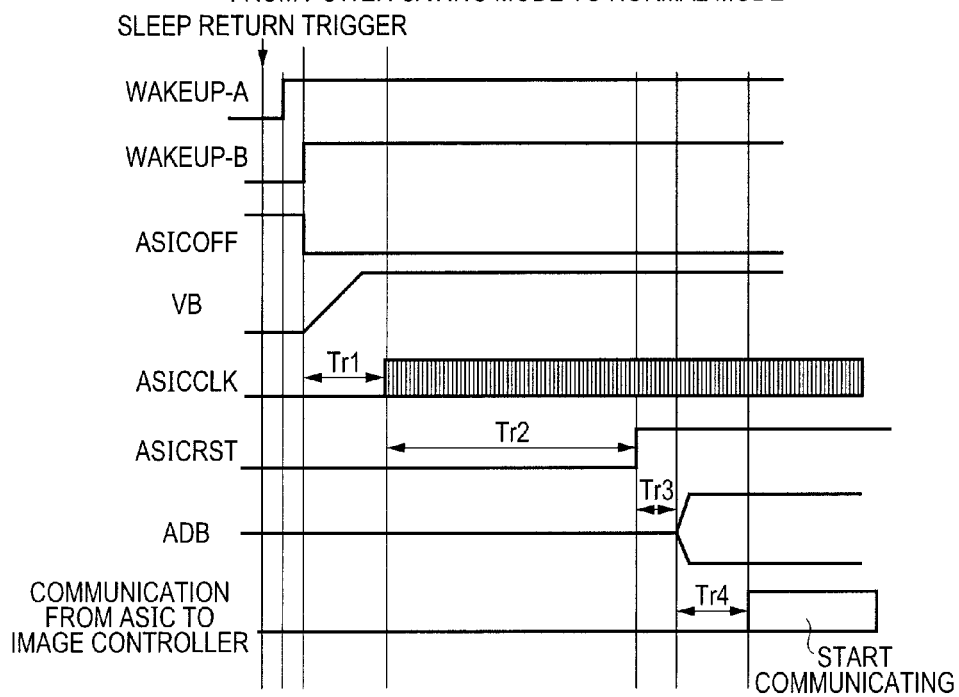
FIG. 8B ⊙ COMMAND FROM CPU TO IMAGE CONTROLLER FROM POWER-SAVING MODE TO NORMAL MODE

| FIG. 9A |
| FIG. 9B |

FIG. 10
| FIG. 10A |
| FIG. 10B |
FIG. 10A
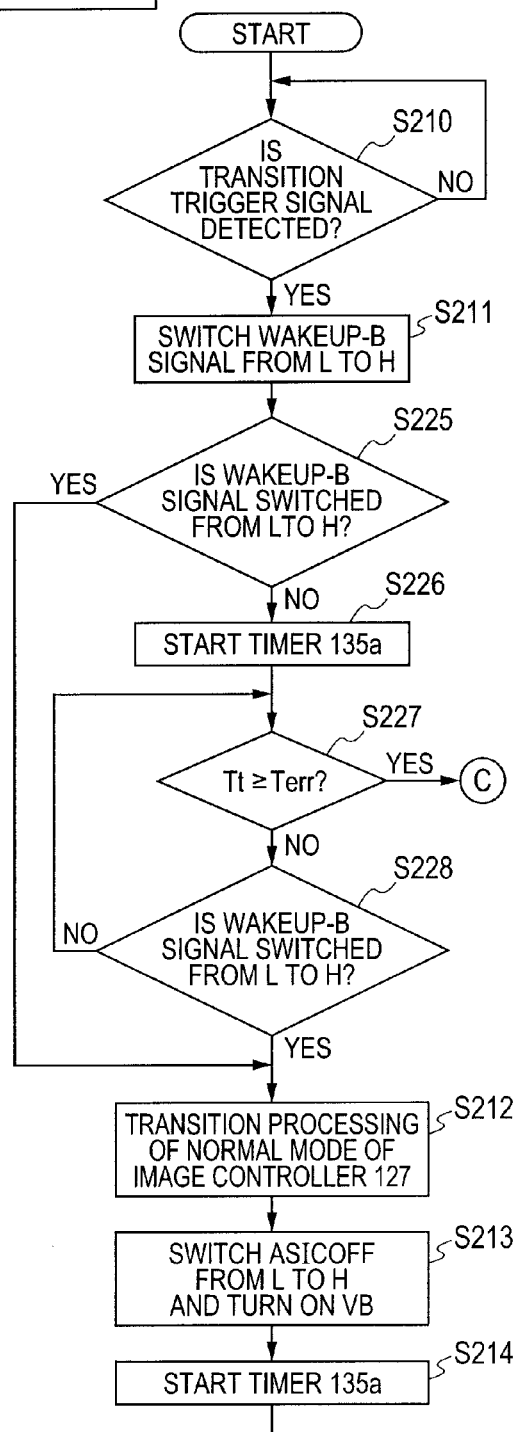
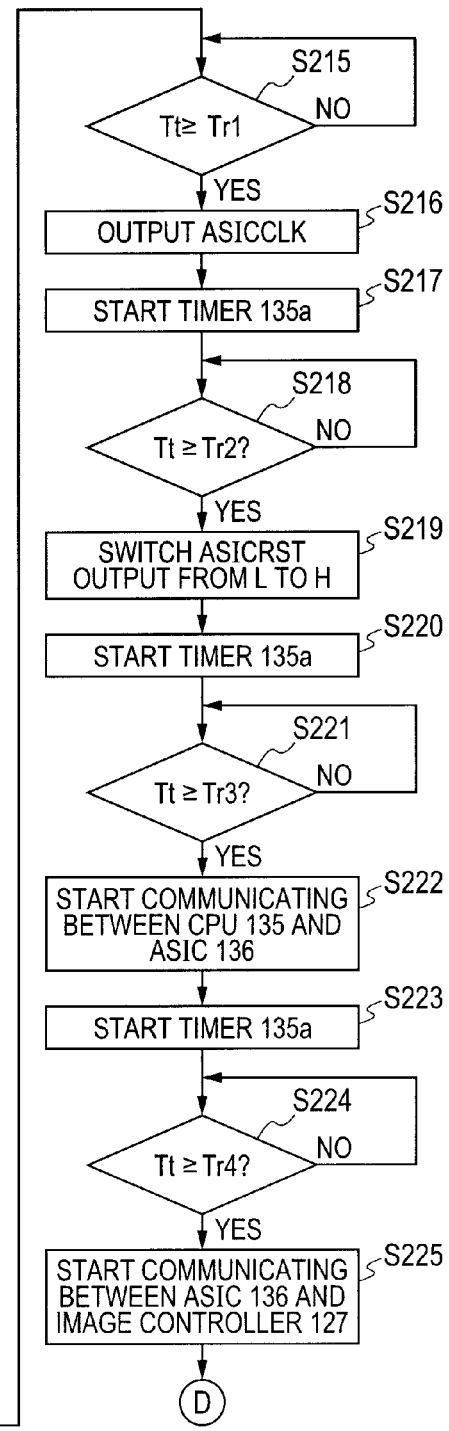

IMAGE FORMING APPARATUS

BACKGROUND OF THE INVENTION

1. Field of the Invention

The present invention relates to an image forming apparatus forming an image on a recording medium.

2. Description of the Related Art

In a conventional image forming apparatus, for the sake of high-speed processing and cost reduction, it is well known to perform various processing related to image formation by an integration circuit. Also, it is well known to configure an application specific integrated circuit (hereinafter referred to as "ASIC") into which a central processing unit (hereinafter referred to as "CPU") is incorporated. Further, frequently, a power supply is commonly used for the CPU and ASIC so as to reduce the cost. For example, as disclosed in Japanese Patent Application Laid-Open No. 2004-009401, in these cases, a communication line provided between the ASIC and an image processing device (hereinafter, image controller) performs various communications related to image formation.

On the other hand, in an image forming apparatus in recent years, it is well known to provide a power-saving mode other than on printing and standby (hereinafter, normal mode) in order to reduce power consumption. In such an image forming apparatus, when a mode is switched from the power-saving mode to the normal mode, it is determined whether or not transition is made between the power-saving mode or the normal mode, based on information transmitted through the communication line connected to the ASIC and the image controller.

In the conventional configuration, however, even in the power-saving mode, since it is necessary to perform communication between the ASIC and the image controller, the ASIC has to be always maintained in a turn-on-state. This configuration thereby offers a problem of increasing the power consumption for the ASIC even in the power-saving mode.

SUMMARY OF THE INVENTION

A purpose of the present invention is to provide an image forming apparatus including an image controller that performs processing of input image information, an engine controller into which a first processing part and a second processing part are combined, wherein the engine controller causes the second processing part to perform a communication regarding image formation with the image controller and controls operation of an image forming unit based on image information processed by the image controller, and a power supply that supplies power to the engine controller, wherein a mode of the image forming apparatus is switchable from a first mode that is a state of image formation or a stand-by state, to a second mode whose power consumption is smaller than a power consumption of the first mode, a switch unit which stops supplying power from the power supply to the second processing part in the second mode and starts supplying power in the first mode, and a communication line that transmits a notification regarding transition from the second mode to the first mode between the image controller and the first processing part, wherein the first processing part controls the switch unit to start supplying power to the second processing part when the image controller orders transition from the second mode to the first mode through the communication line. By this, it achieves stopping power supply of an integration circuit and reducing power consumption.

A further purpose of the invention will become apparent from the following description of exemplary embodiments with reference to the attached drawings.

BRIEF DESCRIPTION OF THE DRAWINGS

FIGS. 5B and 5C illustrate timing charts of commands when the power-saving mode transitions to the normal mode.

FIG. 8A is a timing chart of commands from the image controller to the CPU when the power-saving mode transitions to the normal mode. FIG. 8B is a timing chart of commands from the CPU to the image controller when the power-saving mode transitions to the normal mode.

FIGS. 10A and 10B show the flowchart during transition from the power-saving mode to the normal mode.

DESCRIPTION OF THE EMBODIMENTS

Embodiments of the present invention will now be described in detail as follows.

[Configuration of Image Forming Apparatus]

Figure 1A:
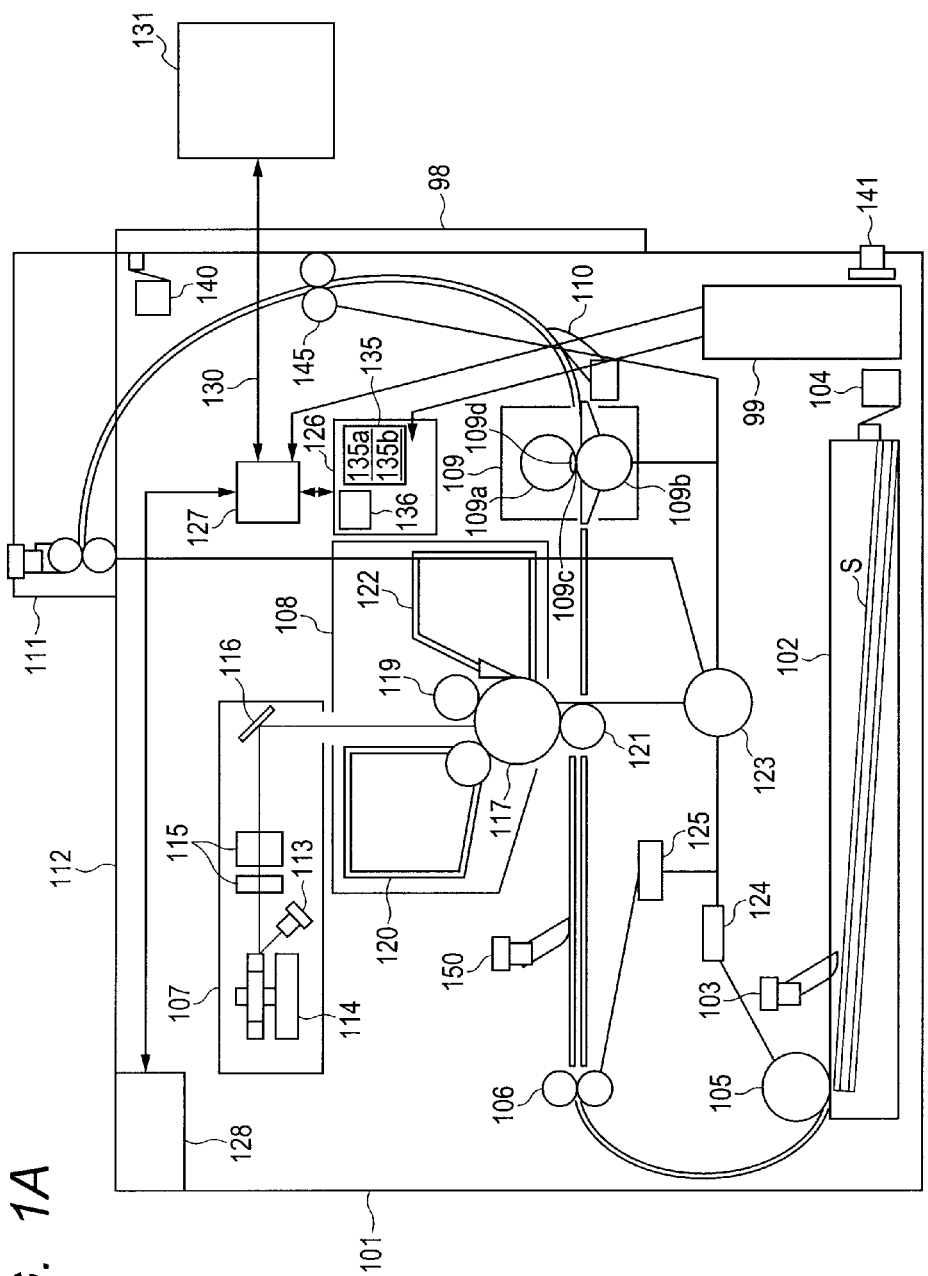
FIG. 1A illustrates a sectional view of an image forming apparatus.

FIG. 1A illustrates a schematic configuration of an image forming apparatus using an electrophotographic process in a case of a laser beam printer. The laser beam printer main body 101 (hereinafter referred to as the main body 101) will hereinafter be described. A cassette 102 stores a recording sheets S (recording material). A cassette sheet presence/absence sensor 103 detects presence or absence of recording sheets S in the cassette 102. A cassette size sensor 104 including plural micro-switches detects the size of the recording sheet S in the cassette 102. A sheet feeding roller 105 feeds a recording sheet S from the cassette 102. A pair of registration rollers 106 arranged downstream from the sheet feeding roller 105 conveys the recording sheet S in a synchronized manner. An image forming unit 108 arranged downstream from the pair of registration rollers 106 forms a toner image on the recording sheet S based on laser light from a laser scanner 107. A fixing unit 109 arranged downstream from the image forming unit 108 thermally fixes the toner image formed on the recording sheet S (on the recording material). A top sensor 150 for detecting the supplied sheet is provided upstream from the fixing unit 109. A discharge sensor 110 for detecting a conveyance state of a discharge unit, a discharge roller 111 for discharging the recording sheet S, and a stacking tray 112 for stacking the recording sheets S after completion of recording are provided downstream from the fixing unit 109. A door 98 is provided so as to take a recording sheet out of the main body 101 when the recording sheet is stacked in the main body.

Opening and closing of the door 98 is detected by a switch 140 for detecting a state of opening or closing of the door.

A low-voltage power supply 99 generates an internal power supply for the main body 101. More specifically, the low-voltage power supply 99 generates and provides a power supply (e.g., 3.3 V power supply) for driving a CPU 135 (first processing part) and an image controller 127 of the main body 101, which will be described later, and a power supply (e.g., 24 V power supply) for driving a drive system. There is a power supply switch 141 in the proximity of the power supply. The CPU 135 detects whether the power supply switch 141 is pressed or not.

The laser scanner 107 includes a laser unit 113, a polygon motor 114, an imaging lens 115 and a reflection mirror 116. The laser unit 113 emits laser light modulated based on an image signal (image signal VDO) transferred from the image controller 127. The polygon motor 114 scans the laser light from the laser unit 113 onto the photo sensitive drum 117. The image forming unit 108 includes the photo sensitive drum 117, a primary charging roller 119, a developing unit 120, a transfer roller 121 and a cleaner 122, which are necessary for the publicly-known electrophotographic process. The fixing unit 109 includes a fixing film 109a, a pressure roller 109b, a ceramic heater 109c including a heating element provided inside of the fixing film, and a thermistor 109d for detecting the surface temperature of each heating element of the ceramic heater 109c.

A main motor 123 provides driving forces to the sheet feeding roller 105 through a sheet feeding solenoid 124, and to the pair of registration rollers 106 through a registration clutch 125. The main motor 123 further supplies driving forces to each element of the image forming unit 108 including photo sensitive drum 117, the fixing unit 109, the discharge roller 111, and a pair of transfer rollers 145. An engine controller 126 performs control of the electrophotographic process by the laser scanner 107, the image forming unit 108 and the fixing unit 109, and transfer control of the recording sheet in the main body 101. The laser scanner 107, the image forming unit 108 and the fixing unit 109 may collectively be referred to as an image forming unit, because these elements are related to a series of the image processing.

The CPU 135 and an ASIC 136 (second processing part) are provided in the engine controller 126 for performing control. The CPU 135 and the ASIC 136 perform driving control of the main motor 123 and the polygon motor 114, overall control of the main body 101, and various computations including a density correction curve (γ curve). Here, the ASIC 136 includes functions of receiving various commands related to image formation from the image controller 127, for example, designation of a sheet feeding inlet and so on, and of notifying the image controller 127 of various statuses related to image formation such as lack of sheets and image data transfer timing. The ASIC 136 also includes a function of driving a motor, and drives various motors. On the other hand, the CPU 135 internally contains a timer 135a, a memory 135b, input and output ports and an A/D port. The CPU 135 performs control of the ASIC 136, complicated computations, and detection of input information. In this embodiment, the CPU 135 and the ASIC 136 are described as packages separate from each other. Instead, the CPU 135 and the ASIC 136 may be mounted on the same package.

The image processing device (hereinafter, image controller) 127 is connected through a universal interface (USB etc.) 130 to an external device 131 like a personal computer. The image controller 127 expands image information transmitted from the universal interface 130 into bit data, and transmits the bit data as a VDO signal to the engine controller 126. The image controller 127 is also connected to a control panel 128, and performs a prescribed process when a user presses the control panel 128.

[Configuration of Engine Controller, Image Controller and Low-Voltage Power Supply]

Figure 1B:
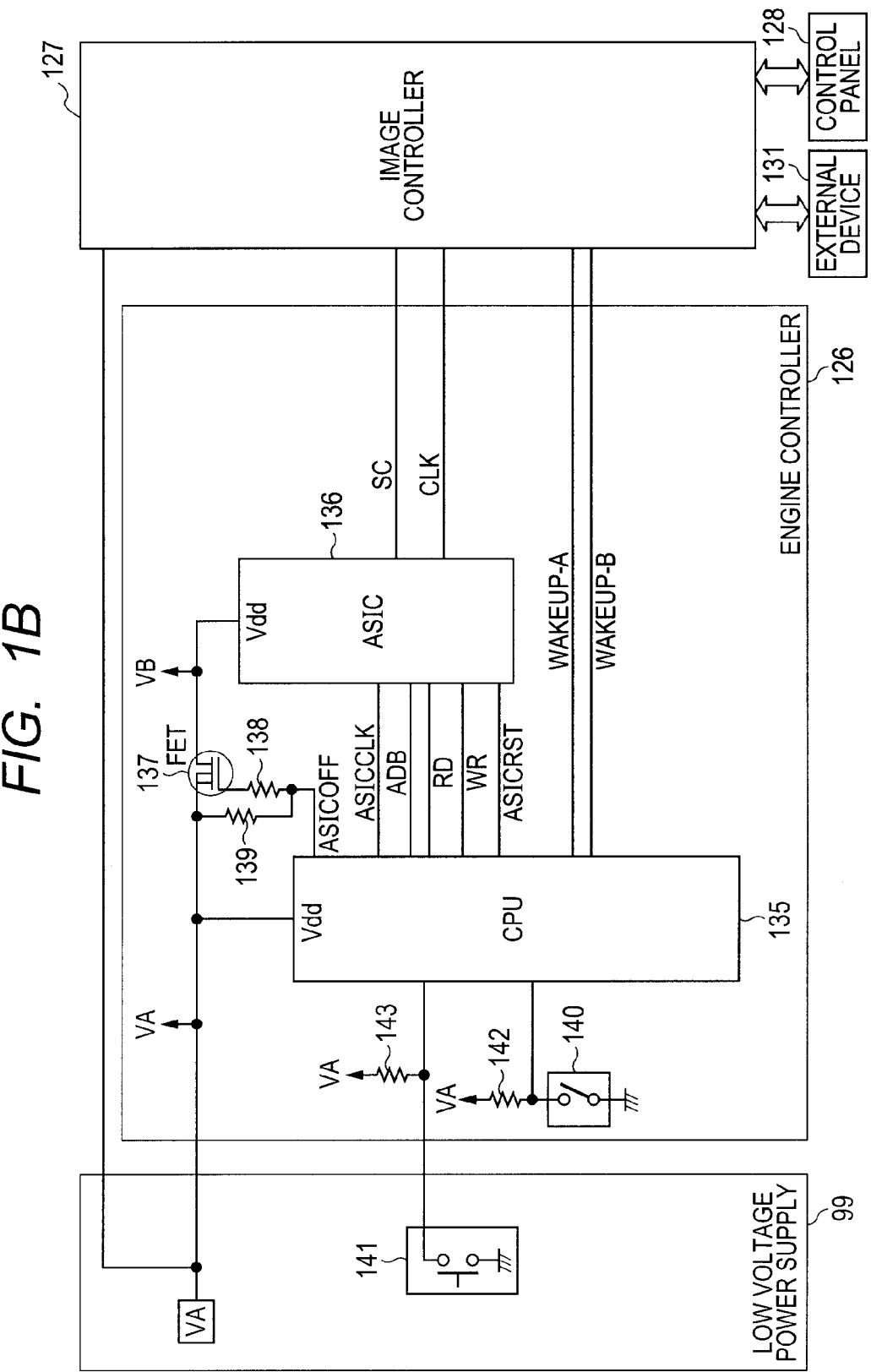
FIG. 1B is a block diagram of the image forming apparatus.

FIG. 1B is a diagram illustrating the details of the engine controller 126, the image controller 127 and the low-voltage power supply 99 of this embodiment. A power supply terminal Vdd of the CPU 135 is supplied with power from the low-voltage power supply 99. More specifically, a power supply VA is input. The power supply VA is also input into the image controller 127. A power supply VB passing through a FET 137 such that the CPU 135 can perform on-off control of the power supply VA is connected to an input terminal Vdd of the ASIC 136. A signal line for an ASICOFF signal is connected to a gate of the FET 137 through a resistance 138 such that the CPU 135 can turn on and off the FET 137, and connected to the power supply VA through a pull-up resistance 139. The power supply VB to the ASIC 136 can be turned off (stopping of the power supply) by setting the ASICOFF signal to an H level. The power supply VB to the ASIC 136 can be turned on (starting of the power supply) by setting the signal to an L level.

Signal lines for a clock signal (ASICCLK) for driving the ASIC 136, an address and data bus signal (ADB), a read signal (RD), a write signal (WR) and a reset signal (ASICRST) are connected between the CPU 135 and the ASIC 136. The CPU 135 and the ASIC 136 process these signals and thereby perform communication between the CPU 135 and the ASIC 136. Signal lines for a bi-directional communication signal (SC) and a clock signal (CLK) are connected between the ASIC 136 and the image controller 127. Communications are performed between the ASIC and the image controller 127 in synchronization with the clock signal from the image controller 127 to the ASIC 136.

This image forming apparatus is capable of transitioning between a normal mode (first mode), which is for printing (a state of forming an image) and standby, and a power-saving mode where the power consumption is suppressed (second mode). A state of providing the ASIC 136 with the power supply may be the normal mode (first mode). A state of not providing the ASIC 136 with the power supply may be the power-saving mode (second mode).

Signal lines (communication lines) for a WAKEUP-A signal and a WAKEUP-B signal for mutually notifying change of modes are connected between the CPU 135 and the image controller 127. Between the image controller 127 and the CPU 135, communications (notifications) pertaining to a transition from the power-saving mode (second mode) to the normal mode (first mode) and a transition from the normal mode (first mode) to the power-saving mode (second mode) are performed through the signal lines. The WAKEUP-A signal is an output signal from the CPU 135 to the image controller 127. The WAKEUP-B signal is an output signal from the image controller 127 to the CPU 135. The transition from the power-saving mode to the normal mode can be notified to the opposite party by switching these signals to one of the H level and the L level, and a subsequent transition process can be performed. The communication lines can realize further effective power saving by stopping the power supply to the ASIC 136, which performs various communications with the image controller 127 in the normal mode, in the power-saving mode. In this embodiment, these signals are at the L level in the power-saving mode and at the H level in the normal mode. However, the converse may be adopted. The communication lines for performing communications of the WAKEUP-A signal and the WAKEUP-B signal can collectively be referred to as a WAKEUP signal line. Each of the CPU 135 and the image controller 127 includes a communication function (communication unit) for transmitting and receiving the WAKEUP-A signal and the WAKEUP-B signal through the signal line (communication line).

A power supply switch 141 is provided in the low-voltage power supply. One terminal of the power supply switch 141 is connected to GND. The other terminal thereof is connected to the VA power supply through the pull-up resistance 143, and further connected as a signal line for the on/off detection signal to the CPU 135. The engine controller 126 is provided with a door open/close switch 140. One terminal of the door open/close switch 140 is connected to GND. The other terminal thereof is connected to the VA power supply through the pull-up resistance 142, and further connected as a signal line for the door open/close detection signal to the CPU 135. In each of the switches, the L level signal is input into the CPU 135 when the switch is pressed, and thereby it can be detected that the switch is pressed. The CPU 135 detects that any one of the switches is set to the L level as a trigger signal of the transition from the power-saving mode to the normal mode, and starts a process of the transition from the power-saving mode to the normal mode. In this embodiment, the on/off detection signal of the power supply switch 141 and the door open/close detection signal of the door open/close switch 140 are used as the trigger signals. However, a signal other than these signals may be used as the trigger signal.

On the other hand, in the image controller 127, operations for triggers of the transition from the power-saving mode to the normal mode include a case where the user presses a switch of the control panel 128 and a case where a signal of starting printing from the external device 131 such as a personal computer is detected. When the image controller 127 detects the triggers, the process of the transition from the power-saving mode to the normal mode is started.

[Process of Transition from the Power-Saving Mode to the Normal Mode]

A processing sequence of the transition from the power-saving mode to the normal mode will be described using a timing chart and a flowchart.

[From Image Controller to CPU]

Figure 2A:
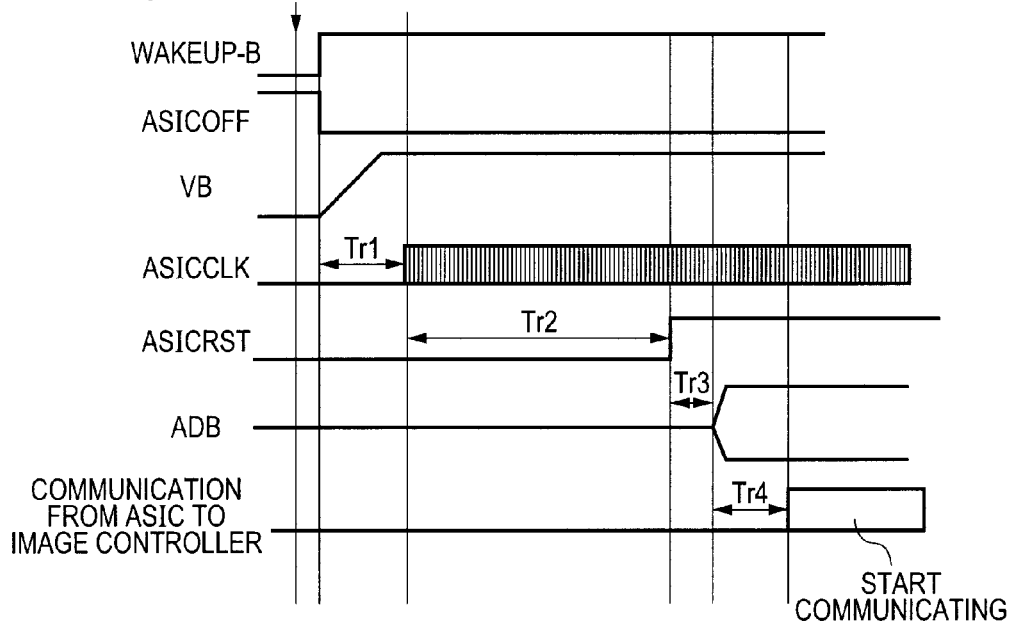
FIG. 2A is a timing chart of commands from an image controller to a CPU when a power-saving mode transitions to a normal mode.
Figure 3A:
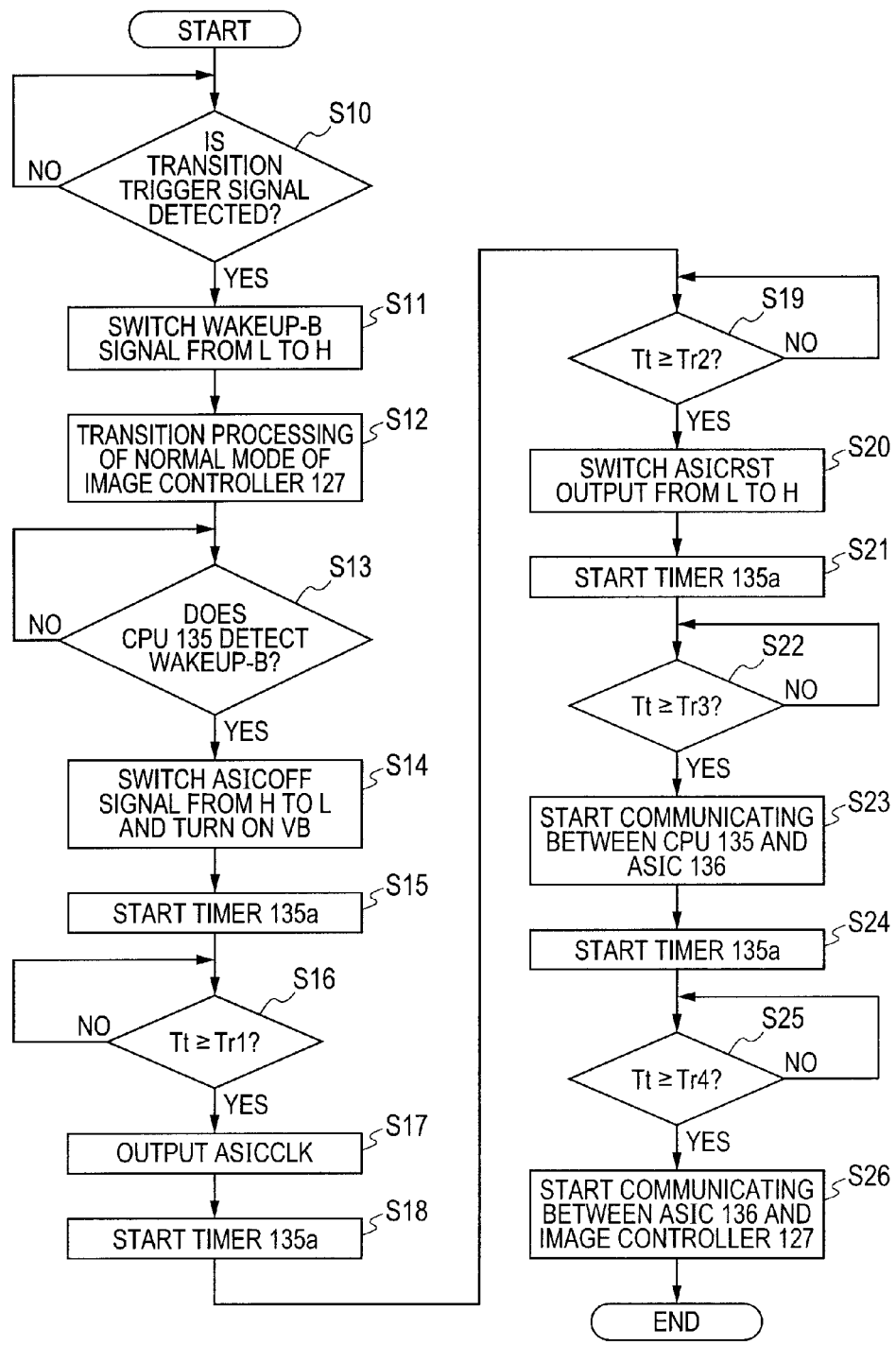
FIGS. 3A and 3B are flowcharts when the power-saving mode transitions to the normal mode.
Figure 3B:
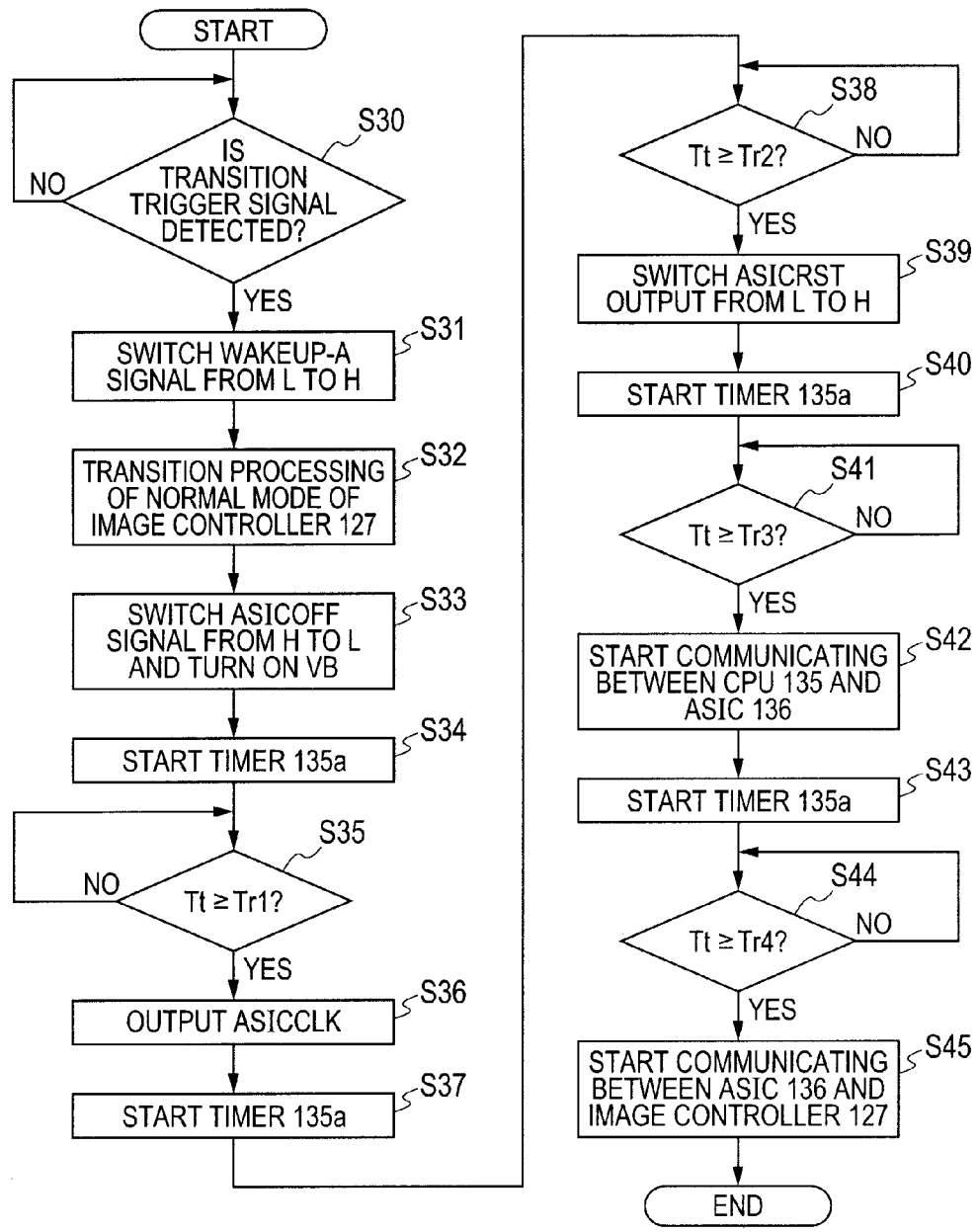

FIGS. 2A and 3B are a timing chart and a flowchart, respectively, when the power-saving mode transitions to the normal mode according to commands (notifications) from the image controller 127 to the CPU 135. The image controller 127 determines whether a transition trigger signal, which is a sleep return trigger signal from the power-saving mode to the normal mode, is detected or not, including a case where the user presses a switch of the control panel 128 and a case where the signal of starting printing from the external device 131 is detected (S10). When the image controller 127 detects the transition trigger signal, the WAKEUP-B signal is switched from the L level to the H level for instructing the CPU 135 to transition its present mode to the normal mode (S11). The image controller 127 internally starts the process to transition the present mode to the normal mode (S12).

The CPU 135 determines whether detecting the switching of the WAKEUP-B signal from the L level to the H level or not (S13). When detecting the switching, the CPU 135 switches the ASICOFF signal from the H level to the L level, and thereby turns on the power supply VB, which is the power supply to the ASIC 136 (S14). When instructed by the image controller 127 to transition from the power-saving mode to the normal mode through the signal line (WAKEUP signal line) for the WAKEUP signal, the CPU 135 causes the FET 137 to operate to start supply power to the ASIC 136.

The CPU 135 starts the internal timer 135a (S15), and compares the time Tt of the timer and an arbitrary prescribed time Tr1 necessary for power supply VB to startup (S16). When the CPU 135 determines that the time Tt of the timer is at least Tr1, the CPU 135 outputs ASICCLK as a process for communication with the ASIC 136 (S17).

The CPU 135 further starts the internal timer 135a (S18), and compares the time Tt of the timer and a prescribed time Tr2 necessary for the ASIC 136 from receiving the ASICCLK signal to cancellation of reset (S19). When the CPU 135 determines that the time Tt of the timer is at least Tr2, the CPU 135 switches the ASICRST signal from the L level to the H level, and thereby cancels reset of the ASIC 136 (S20). The CPU 135 further starts the internal timer 135a (S21), and compares the time Tt of the timer and a prescribed time Tr3 necessary for the ASIC 136 from cancellation of the reset to reception of a signal on an AD bus line (S22). When the CPU 135 determines that the time Tt is at least Tr3, the CPU 135 starts a communication with the ASIC 136 using the ADB signal (S23). The CPU 135 further starts the internal timer 135a (S24), and compares the time Tt of the timer and a prescribed time Tr4 necessary to complete an initialization process before the communication between the CPU 135 and the ASIC 136 (S25). When the CPU 135 determines that the time Tt is at least Tr4 and instructs the ASIC 136 to start a communication, the ASIC 136 starts a communication with the image controller 127 using the SC and CLK signals (S26). The power-saving mode transitions from the power-saving mode to the normal mode by performing such control.

[From CPU to Image Controller]

Figure 2B:
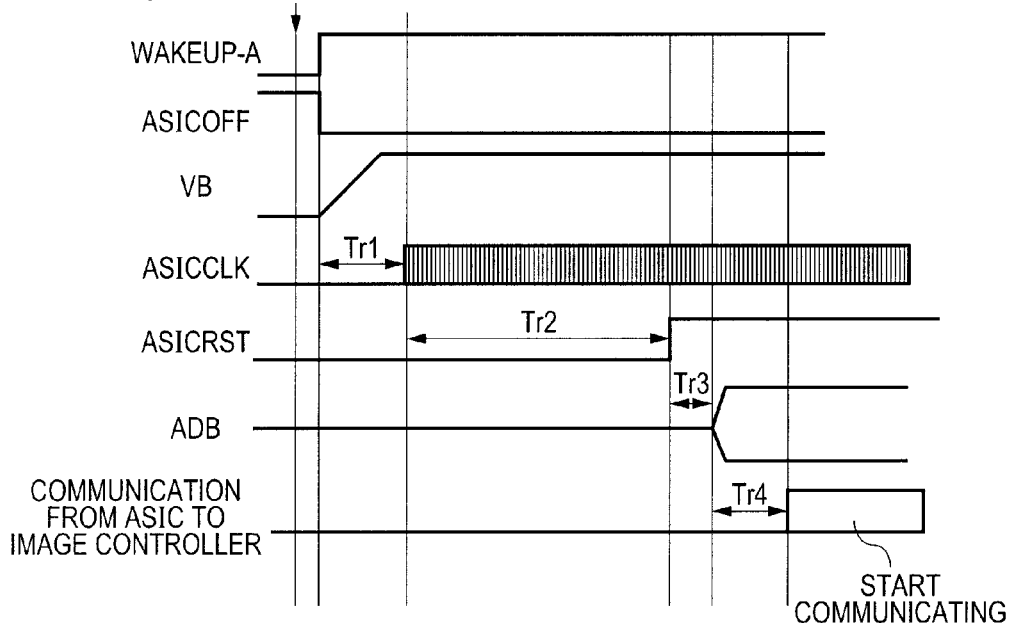
FIG. 2B is a timing chart of commands from the CPU to the image controller when the power-saving mode transitions to the normal mode.

FIGS. 2B and 3B are a timing chart and a flowchart, respectively, when the power-saving mode transitions to the normal mode according to the CPU 135 of this embodiment responsive to detection of the transition trigger signal including a signal that the power supply switch 141 is pressed and the door open/close detection signal. The CPU 135 determines whether the trigger signal of transition to the normal mode, which includes a power switch on/off detection signal, the door open/close detection signal and detection of the switch signal is detected or not (S30). When the CPU 135 detects the transition trigger signal, the CPU 135 switches the WAKEUP-A signal from the L level to the H level for notifying the image controller 127 of the transition to the normal mode (S31). When detecting this signal, the image controller 127 internally starts the normal mode processing (S32). The processes performed by one of the CPU 135 and the ASIC 136 in S33 to S45 in FIG. 3B are identical to the processes performed by one of the CPU 135 and the ASIC 136 in S14 to S26 in FIG. 3A. Accordingly, the description thereof is omitted. The power-saving mode can transition from the power-saving mode to the normal mode by performing such control.

In the power-saving mode, the operating clock in the CPU 135 may preliminarily be set to a low clock mode where the frequency is lower than the typical frequency, and may be changed to a clock having a high frequency on transition to the normal mode, thereby reducing the power consumption in the power-saving mode.

According to this embodiment, the power supply to the ASIC can be turned off in the power-saving mode. This configuration can suppress the power consumption and be effective in power saving.

In the embodiment 1, the signal lines for the signals for the transition from the power-saving mode to the normal mode, which include the WAKEUP-A signal and the WAKEUP-B signal, are configured between the CPU 135 and the image controller 127 as two separate signal lines. In this embodiment, the signal lines are configured as one signal line using a bi-directional buffer.

Figure 4A:
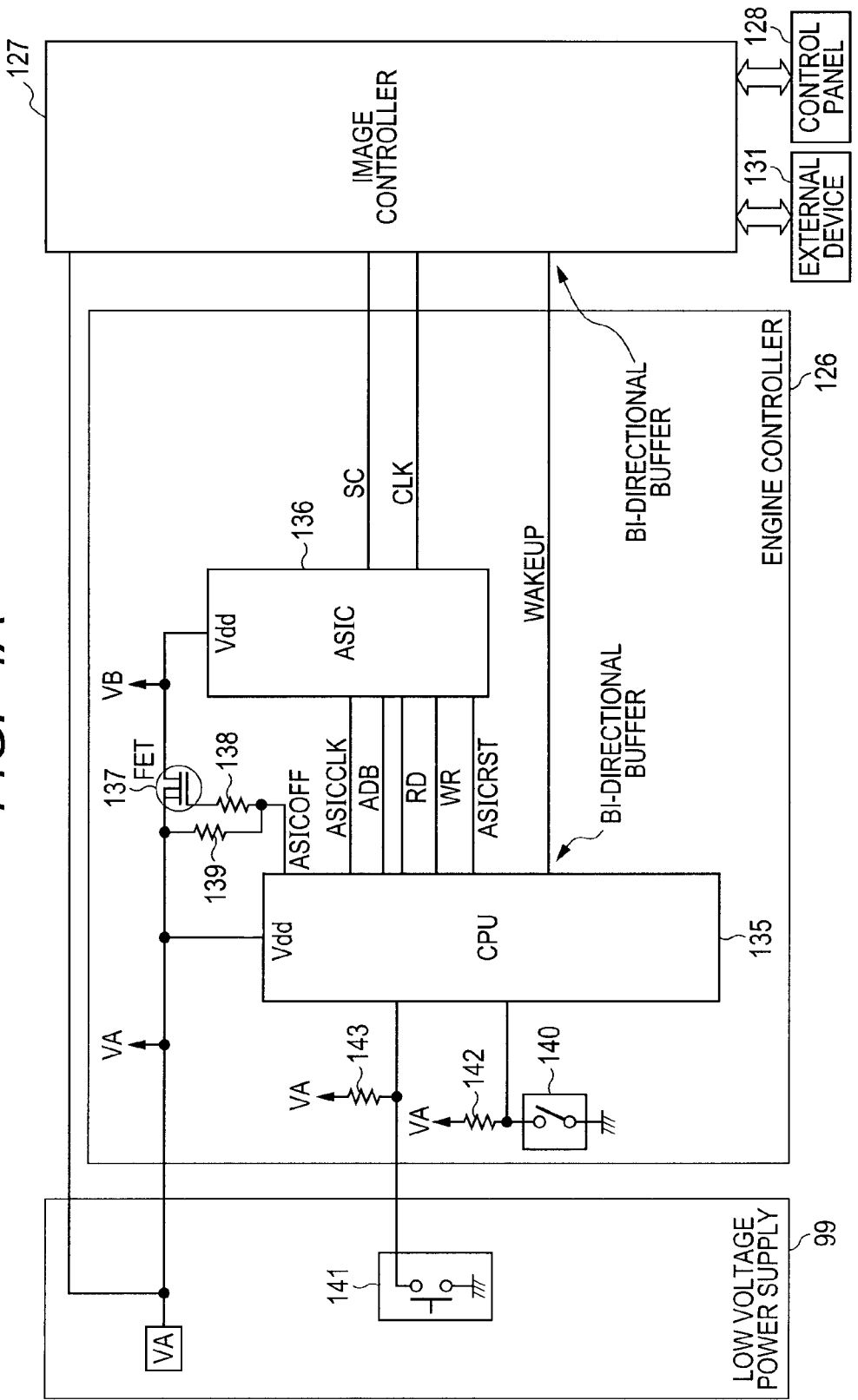
FIG. 4A is a block diagram of the image forming apparatus.
Figure 4B:
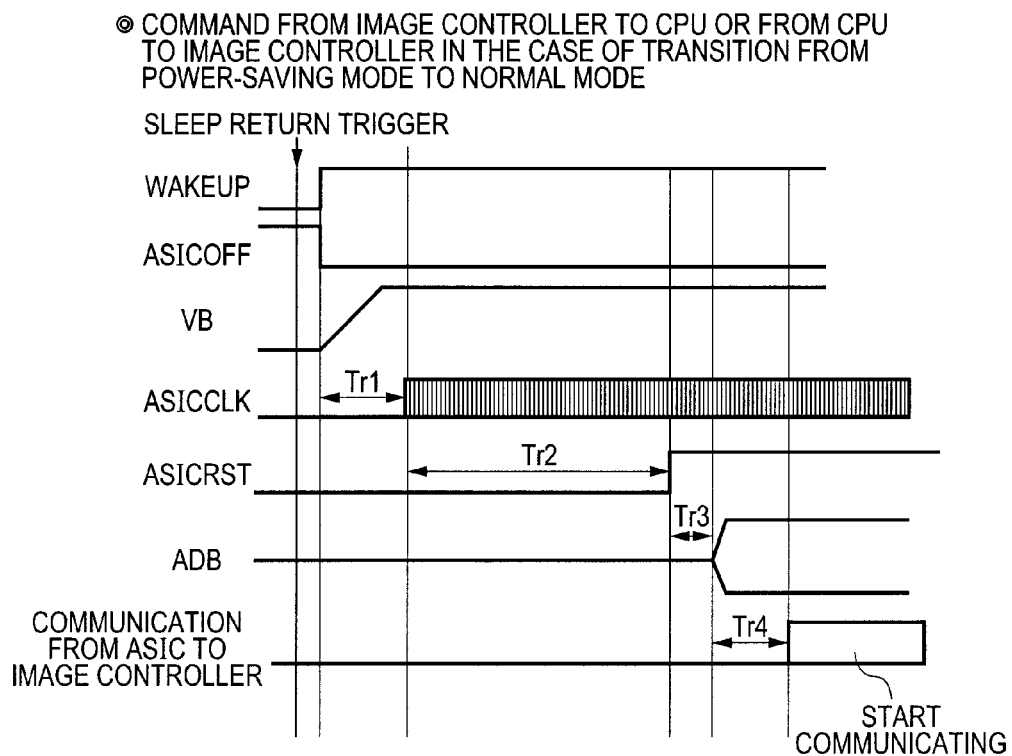
FIG. 4B is a timing chart when the power-saving mode transitions to the normal mode.

FIG. 4A illustrates the details of the engine controller 126, the image controller 127 and the low-voltage power supply 99 of this embodiment. This embodiment is different from the embodiment 1 in that the signal of the transition from the power-saving mode to the normal mode is dealt with as the WAKEUP signal using a bi-directional buffer with one line. FIG. 4B is a timing chart when the power-saving mode transitions to the normal mode according to one of notification from the image controller 127 to the CPU 135 and a notification from the CPU 135 to the image controller 127. As with the embodiment 1, when one of the image controller 127 and the CPU 135 determines that the transition from the power-saving mode to the normal mode is required, the one of the image controller 127 and the CPU 135 switches the L level to the H level to notify the opposite party of the output of the WAKEUP signal. When the CPU 135 detects the WAKEUP signal, operations analogous to the operations in S11 and thereafter in FIG. 3A of the embodiment 1 are performed. When the image controller 127 detects the signal, operations analogous to the operations in S31 and thereafter in FIG. 3B of the embodiment 1 are performed.

According to this embodiment, the signal line for the trigger signal of the transition from the power-saving mode to the normal mode can be achieved by only one communication line. In the power-saving mode, the power supply of the ASIC can be turned off, thereby allowing the power consumption to be suppressed.

In the embodiments 1 and 2, the transition trigger signal of transition from the power-saving mode to the normal mode and the transition trigger signal from the image controller 127 for transition to the normal mode are detected by connections to normal I/O ports of the CPU 135. In this embodiment, the signal connections are detected when they are input to interrupt ports. Accordingly, in the power-saving mode, even when the CPU 135 sets a clock stopping mode for stopping the internal operating clock to further reduce the power consumption, the transition to the normal mode can be performed.

Figure 5A:
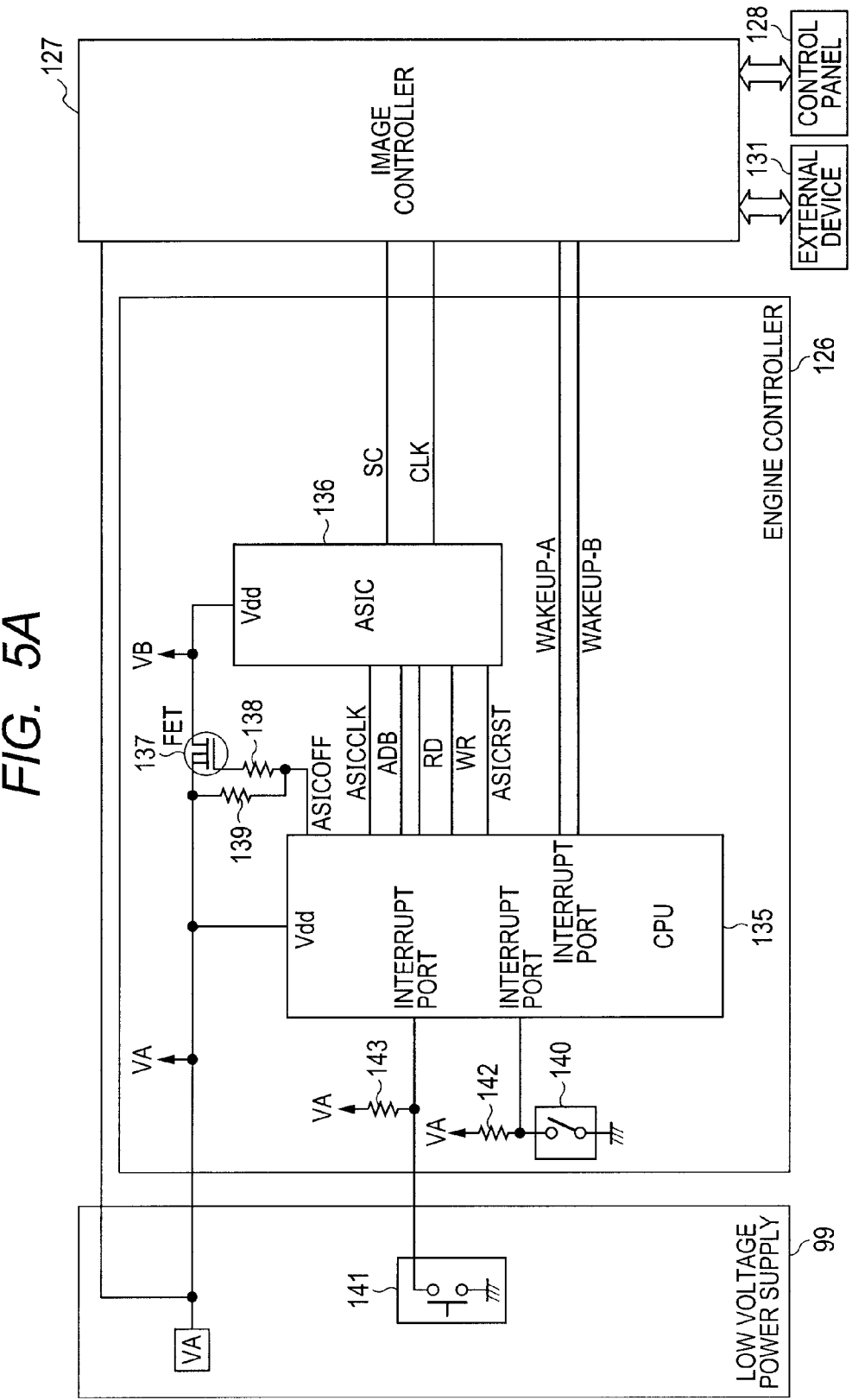
FIG. 5A is a block diagram of the image forming apparatus.

FIG. 5A is a diagram illustrating the details of the engine controller 126, the image controller 127 and the low-voltage power supply 99 of this embodiment. Interrupt ports are assigned as input ports of the CPU 135 for detecting the transition trigger signal from the power-saving mode to the normal mode, instead of the normal ports, so as to be capable of detection even in the clock stopping mode of the CPU 135. Here, as with the embodiment 1, the signals as triggers are the switch signals, such as the power switch on/off detection signal of the CPU 135 and the door open/close detection signal. The WAKEUP-B signal is also input into the interrupt port of the CPU 135. Because the interrupt port is utilized, the CPU 135 can be set to the clock stopping mode, in the power-saving mode. Accordingly, the power consumption of the CPU 135 can further be reduced.

[From Image Controller to CPU]

Figure 6A:
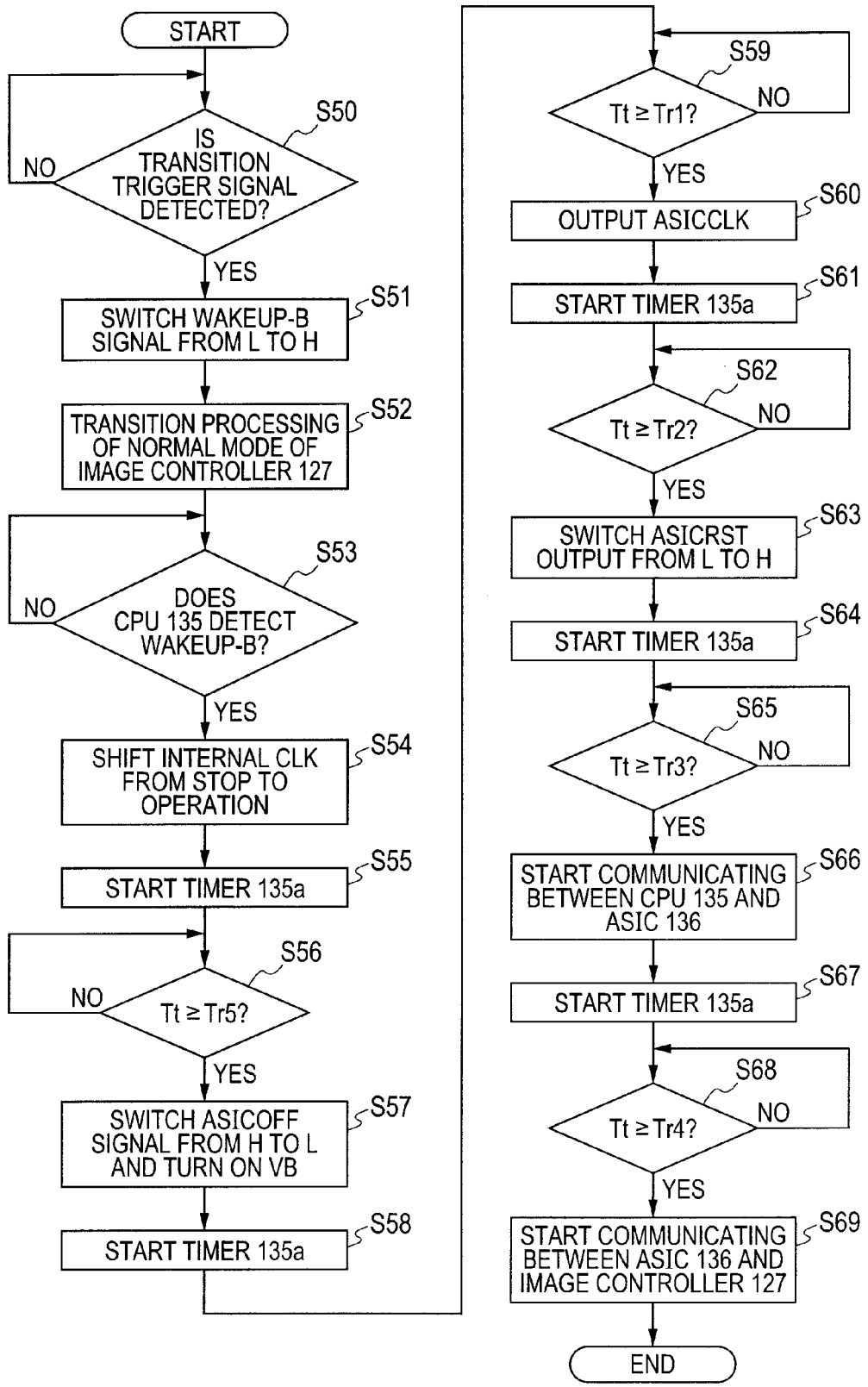
FIGS. 6A and 6B illustrate flowcharts when the power-saving mode transitions to the normal mode.

FIGS. 5B and 6A are a timing chart and a flowchart, respectively, when the power-saving mode transitions from the power-saving mode to the normal mode according to commands from the image controller 127 to the CPU 135. Processes S50 to S52 performed by one of the image controller 127 and the CPU 135 are identical to the processes of S10 to S12 in FIG. 3A. Accordingly, the description thereof is omitted. The CPU 135 determines whether the WAKEUP-B signal has been switched from the L level to the H level or not (S53). The clock of the CPU 135 in this embodiment is stopped in the power-saving mode. When the WAKEUP-B signal is switched to H, the information is input into the interrupt port, and the CPU starts the internal CLK operation and starts processes for transition to the normal mode (S54). The CPU 135 starts the internal timer 135a (S55), and compares the time Tt of the timer and a prescribed time Tr5 (S56). Here, the prescribed time Tr5 is the time necessary for the initialization process on startup of the CPU 135. When the CPU 135 determines that the time Tt becomes at least the prescribed time Tr5, the CPU 135 sets the ASICOFF signal from the H level to the L level, thereby turning on the power supply VB to the ASIC 136 (S57). Subsequently, processes S58 to S69 performed by one of the CPU 135 and the ASIC 136 are identical to the processes S15 to S26 in FIG. 3A. Accordingly, the description thereof is omitted. Since such control is performed, the power-saving mode can transition to the normal mode even when the CPU 135 is in the clock stopping mode state.

[From CPU to Image Controller]

Figure 6B:
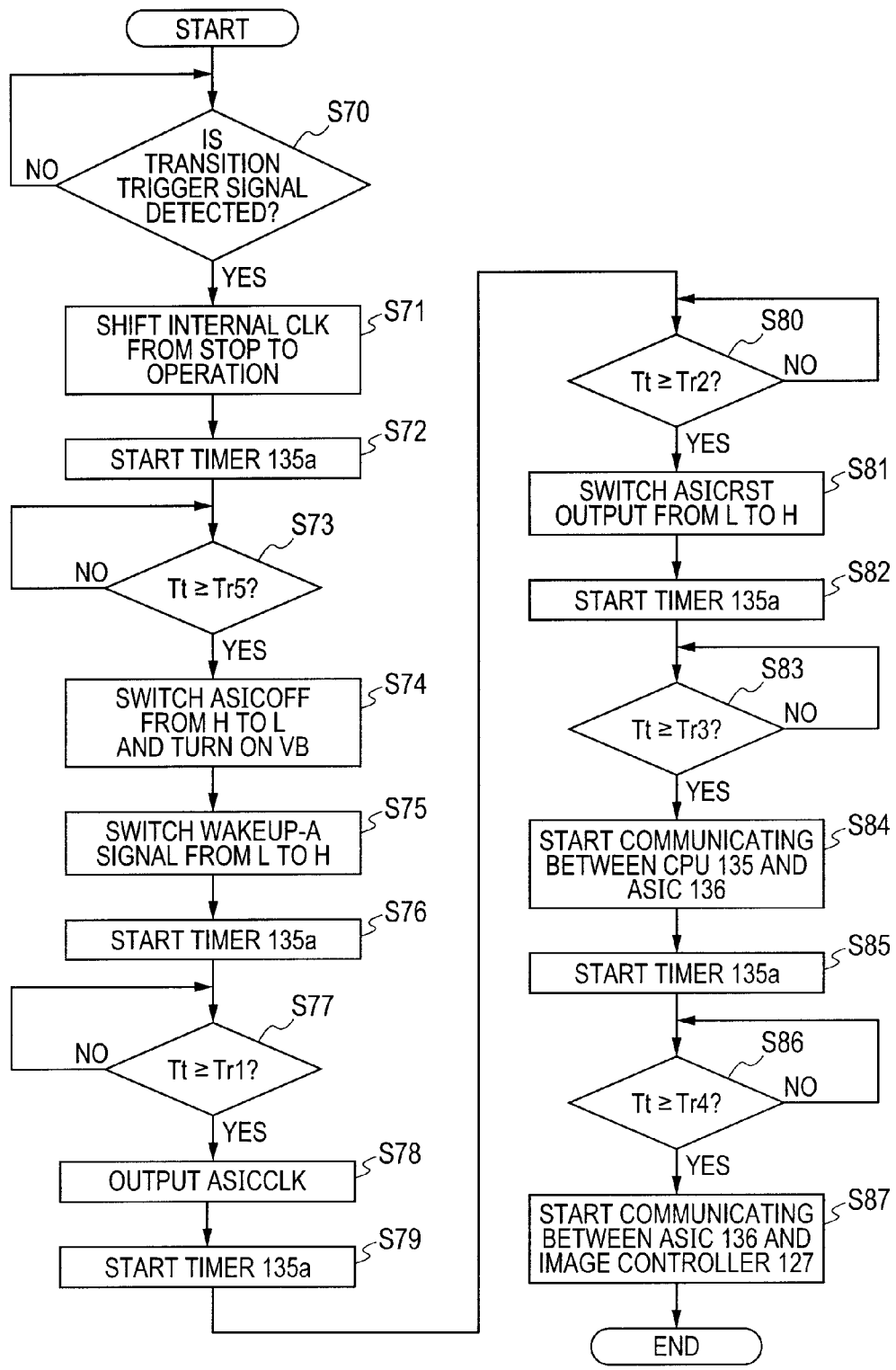

FIGS. 5C and 6B are a timing chart and a flowchart, respectively, when the CPU 135 detects a user access by the interrupt port, such as the pressing signal of the power supply switch 141 and the door open/close detection signal. The CPU 135 determines whether the trigger signal of the transition from the power-saving mode to the normal mode is detected or not (S70). The CPU 135 stops the internal clock in the power-saving mode. However, the detection signal is input through the interrupt port. In a case where the CPU 135 determines that the transition to the normal mode is required, such as a case of detection of the switch signal, the CPU 135 returns from the stopping of the internal clock and starts the clock operation (S71). The CPU 135 starts the internal timer 135a (S74), and compares the time Tt of the timer and the prescribed time Tr5 (S73). When the CPU 135 determines that the time Tt is at least Tr5, the CPU 135 switches the ASICOFF signal from the H level to the L level for turning on the power supply VB to the ASIC 136, and turns on the power supply VB to the ASIC 136 (S74). The CPU 135 switches the WAKEUP-A signal from the L level to the H level for notifying the image controller 127 of the transition to the normal mode (S75). Processes S76 to S87 performed by one of the CPU 135 and the ASIC 136 are identical to the processes in S34 to S45 in FIG. 3B. Accordingly, the description thereof is omitted. Since such control is performed the transition from the power-saving mode to the normal mode can thereby be performed even when the CPU 135 is in the clock stopping mode state.

The operation of this embodiment is described on a case where the transition signal to the normal mode is dealt with in the two line system, as with the embodiment 1. However, the one line system can be adopted as with the embodiment 2.

According to this embodiment, the signal lines for the trigger signal and the signal of transition to the normal mode are connected to the interrupt ports. Thus, even when the clock of the CPU 135 is set to the stopping state in the power-saving mode, the transition to the normal mode can be performed. The power consumption can further be decreased in the power-saving mode.

This embodiment adopts a configuration where the power supply to a temperature detecting unit such as an element of detecting the temperature of the fixing unit (thermistor) is connected to the same power supply as the power supply to the CPU 135. The CPU 135 operates in the low clock mode, which has been described above, and operates in a manner capable of detecting an input into an A/D port.

Figure 7:
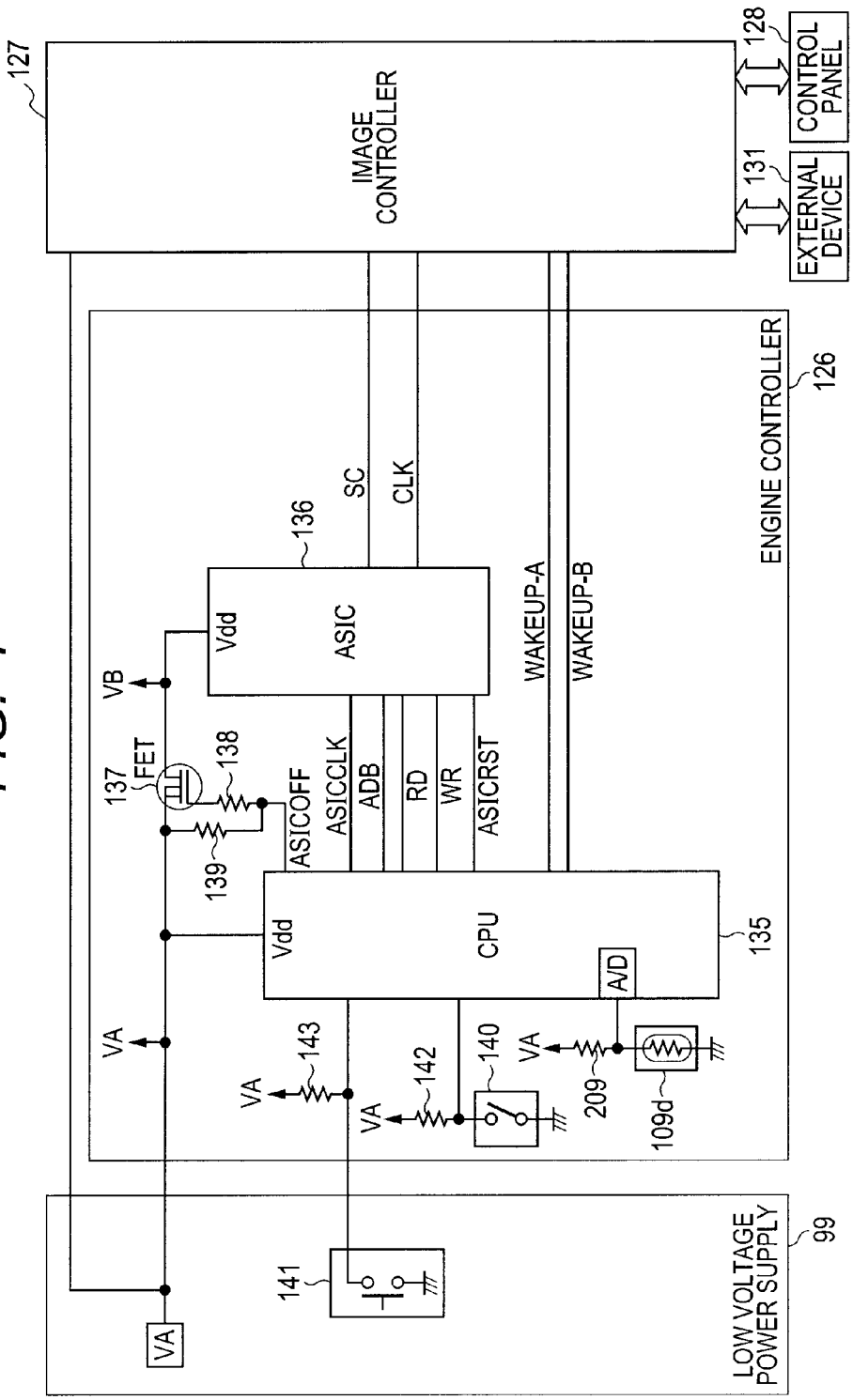
FIG. 7 is a block diagram of the image forming apparatus.

FIG. 7 is a diagram illustrating the details of the engine controller 126, the image controller 127 and the low-voltage power supply 99 of this embodiment. One terminal of the thermistor 109d, which is the element of detecting the temperature of the fixing unit 109, is connected to the GND. The other terminal of the thermistor 109d is connected to VA, which is the power supply to the CPU 135, through a pull-up resistance 209, and further connected to the A/D port in the CPU 135. The voltage divided for the thermistor 109d and the resistance 209 is input into the A/D port as a signal of the detection result from the thermistor 109d. Accordingly, the CPU 135 can detect the surface temperature of the heating element. According to the configuration as illustrated in FIG. 7, the switching of the FET 137 pursuant to the ASICOFF signal connects the thermistor 109d to the power supply VA and thereby enables the detection of the surface temperature of the heating element to be performed, even when the supply power to the ASIC 136 is stopped.

With respect to formation of an image, even in a case where the pull-up resistance 209 of the thermistor 109d is connected to the power supply VB, the fixing unit can operate in the normal mode, as a matter of course. However, in a case of connection to the power supply VB, the power supply VB is not provided in the power-saving mode, and the voltage of the thermistor 109d cannot be detected. For example, abnormality that the surface temperature of the heating element is high cannot be detected, and the safety is decreased. On the contrary, according to this embodiment, the temperature of the fixing unit 109 can be detected in the power-saving mode while the functions of the embodiments 1 and 2 are realized, by connecting the pull-up of the thermistor 109d to the power supply VA, which is the identical power supply to the CPU 135. Therefore, the safety is improved including performance of prescribed processing when abnormality such as high temperature is detected. If the thermistor 109d is pulled up by the power supply VB after the intervention of the FET 137, the voltage for an on-resistance of the FET 137 is decreased with respect to the power supply VA. However, connection to the power supply VA eliminates a drop voltage, and allows an accurate detection of the temperature.

This embodiment is substantially identical to the embodiments 1, 2 and 3. However, this embodiment adopts a configuration that the power-saving mode transitions to the normal mode after transmission and reception of the signal in a bi-directional manner. Accordingly, breakage of the signal line for the signal of the transition from the power-saving mode to the normal mode and errors of the CPU and the ASIC and an error of the image controller can be detected.

[From the Image Controller to CPU]

Figures 9, 9A:
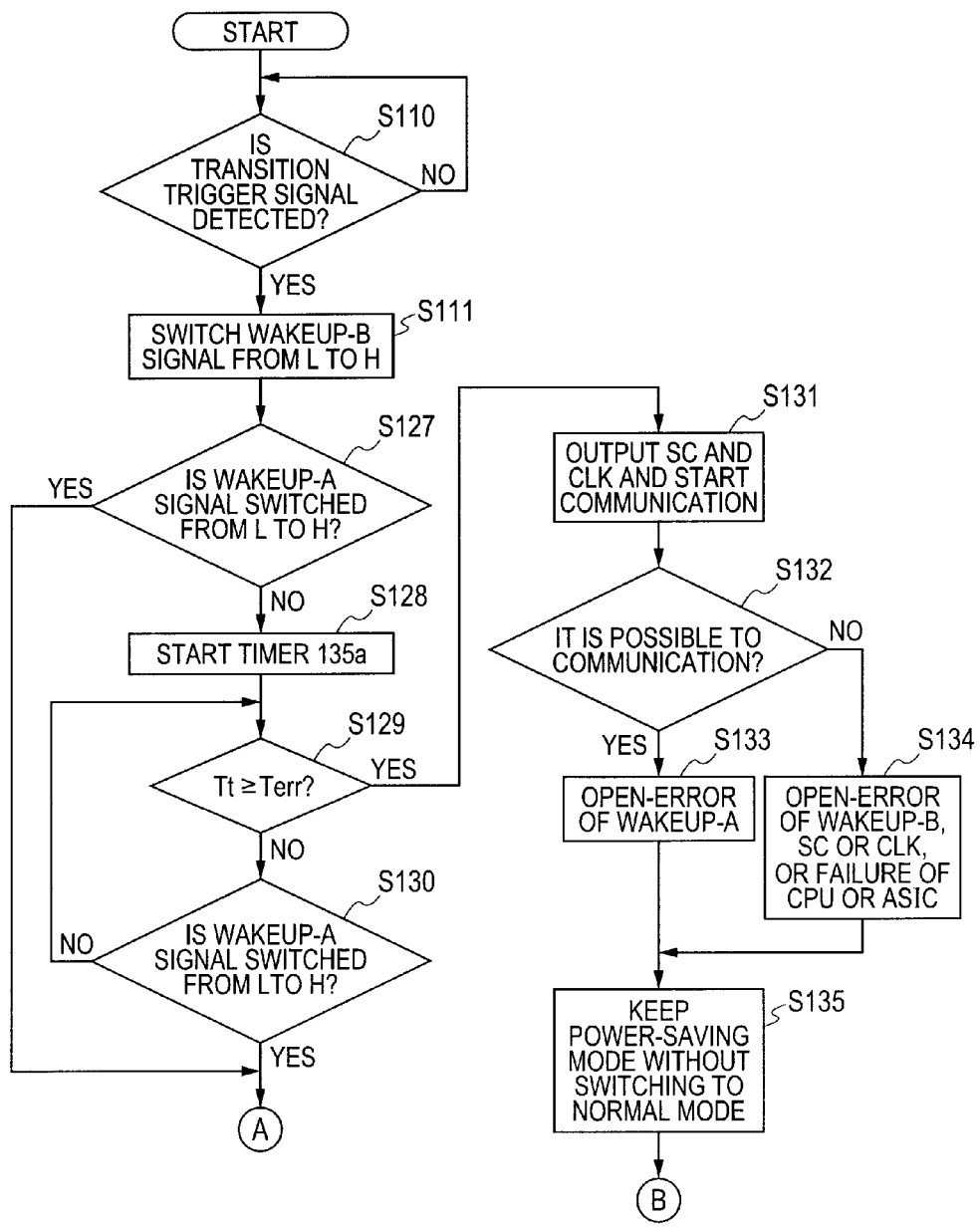
FIGS. 9A and 9B show the flowchart during the transition from the power-saving mode to the normal mode.
Figure 9B:
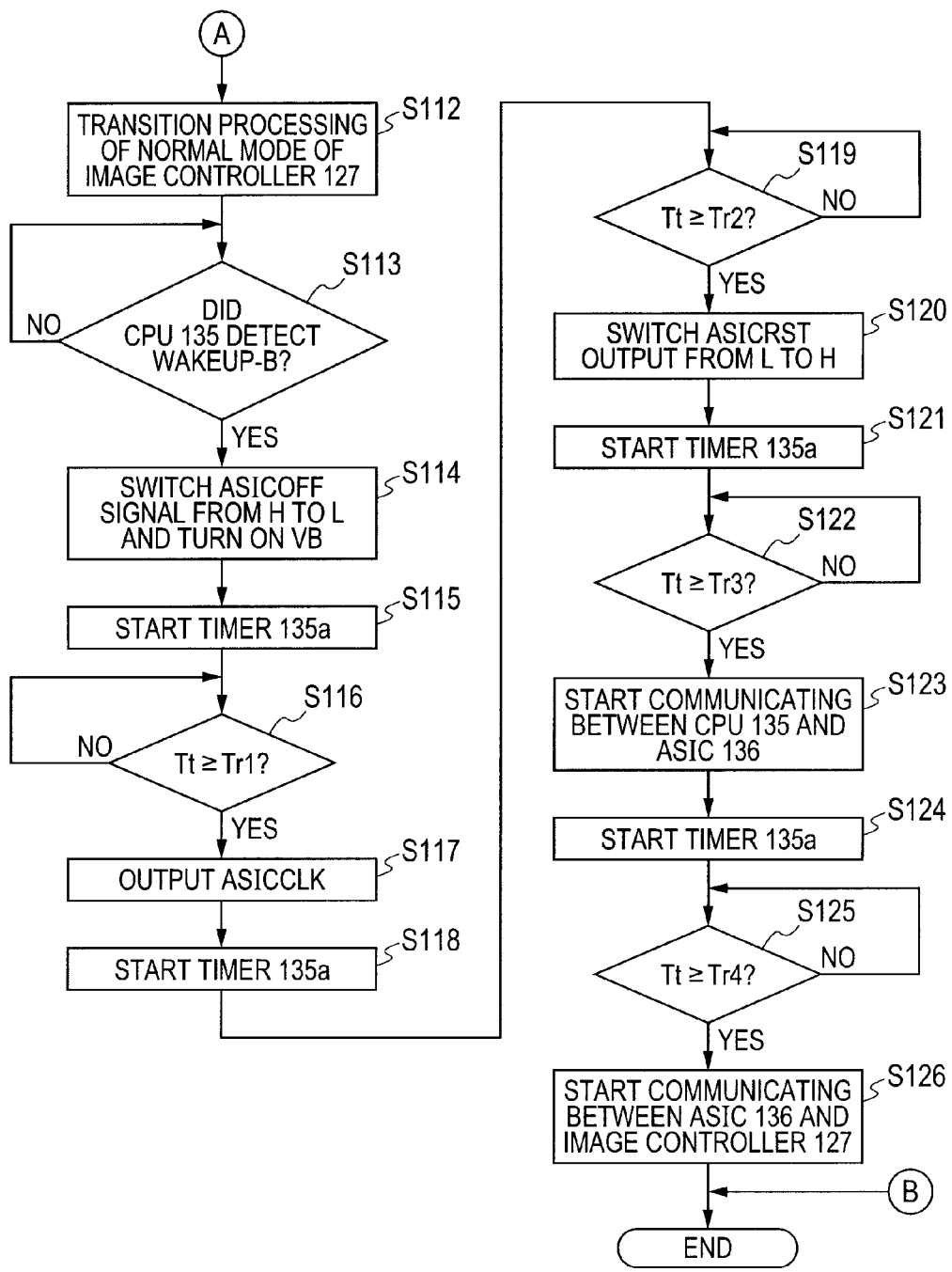

FIGS. 8A, 9A and 9B illustrate timing charts when the power-saving mode transitions to the normal mode according to commands from the image controller 127 to the CPU 135 in this embodiment. The image controller 127 determines whether the transition trigger signal to the normal mode is detected or not (S110). When the image controller 127 detects the transition trigger signal, the image controller 127 switches the WAKEUP-B signal from the L level to the H level for notifying the CPU 135 of the transition to the normal mode (S111). The image controller 127 determines whether the WAKEUP-A signal from the CPU 135 is switched from the L level to the H level or not, that is, presence or absence of a response from the CPU 135 (S127). The CPU 135 switches the WAKEUP-A signal to the H level after detecting the switching of the WAKEUP-B signal, in order to notify the image controller 127 of normal operation of the CPU 135. When the image controller 127 determines that the WAKEUP-A signal has been switched to the H level, that is, the response has been received from the CPU 135 in S123, the processing proceeds to S112. When the WAKEUP-A signal has not been switched to the H level yet, the CPU 135 starts the timer 135a (S128), and determines whether the value Tt of the timer is at least an error detection time Terr or not (S129). When the time Tt is less than Terr, the image controller 127 determines again whether the WAKEUP-A signal has been switched from the L level to the H level or not (S130). If the signal has not been changed yet, the processing returns to S125. If the WAKEUP-A signal has been changed to the H, the processing proceeds to S112.

If the CPU 135 determines that the time Tt is at least the error detection time Terr in S125, a communication to the ASIC 136 is started through signal lines for the SC signal, which is a communication signal connecting the image controller 127 and the ASIC 136, and the CLK signal (S131). The CPU 135 determines whether a communication with the ASIC 136 can be performed or not (S132). If it is determined that the communication can be performed, CPU 135 determines that the WAKEUP-A signal is in a broken line error state (S133). If the CPU 135 determines that the communication cannot be performed, the CPU 135 determines that one of a broken line error of the signal lines for one of the WAKEUP-B signal, the SC signal and the CLK signal, and a malfunction of one of the CPU 135 and the ASIC 136 has occurred (S134). If the CPU 135 determines that the error such as in S129 and S130 has occurred, the CPU 135 does not perform the transition to the normal mode and continues the power-saving mode (S135).

When the image controller 127 determines that the WAKEUP-A signal has been switched from the L level to the H level in one of S123 and S126, the image controller 127 internally starts the process of transitioning to the normal mode (S112). Processes S113 to S126 performed by one of the CPU 135 and the ASIC 136 are identical to the processes S13 to S26 in FIG. 3A. Accordingly, the description is omitted. Thus, the configuration of waiting the response from the WAKEUP-A signal after the WAKEUP-B signal has been switched from the L level to the H level is adopted. Accordingly, one of breaks in the signal lines for the WAKEUP-A signal, the WAKEUP-B signal, the SC signal and the CLK signal, and malfunctions of one of the CPU 135 and the ASIC 136 can be detected.

[From the CPU to Image Controller]

Figure 10B:
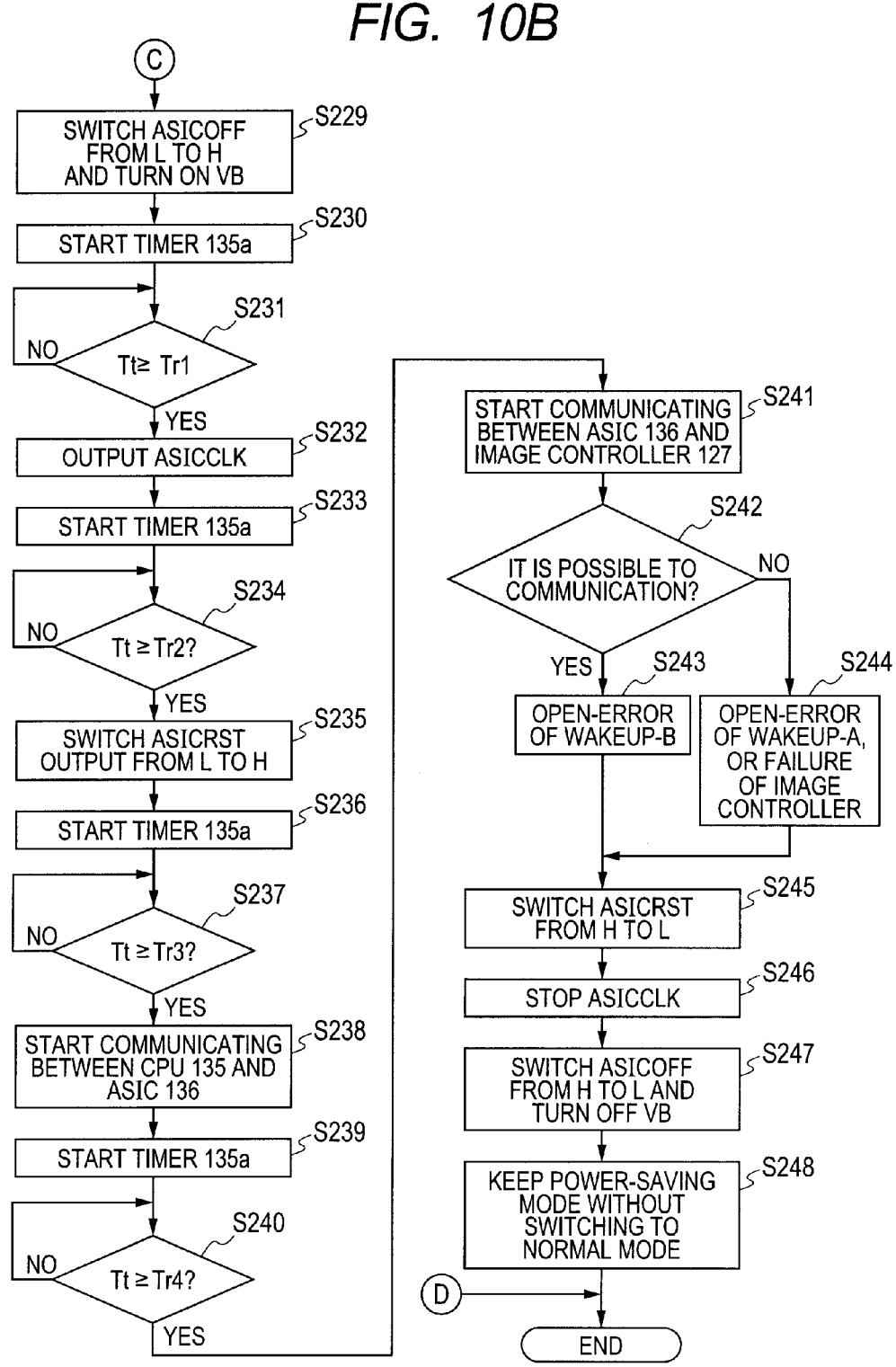

FIGS. 8B, 10A and 10B are a timing chart and a flowchart, respectively, when the power-saving mode transitions to the normal mode according to detection of the transition trigger signal by the CPU 135 of this embodiment, such as the signal of pressing of the power supply switch 141 and the door open/close detection signal. The CPU 135 determines whether the transition trigger signal to the normal mode is detected or not (S210). When the CPU 135 detects the transition trigger signal, the CPU 135 switches the WAKEUP-A signal from the L level to the H level for notifying the image controller 127 of the transition to the normal mode (S211). The CPU 135 determines whether the WAKEUP-B signal has been changed from the L level to the H level or not, that is, a response has been transmitted from the image controller 127 or not, in order to confirm that the image controller 127 normally operates (S225). If the response is transmitted from the image controller 127, the processing proceeds to S212. If the CPU 135 determines that the WAKEUP-B signal has not been changed to the H level, the CPU 135 starts the timer 135a (S226), and determines whether the value Tt of the timer is at least the error detection time Terr or not (S227). When the CPU 135 determines that the time Tt is less than Terr, the CPU 135 determines again whether the WAKEUP-B signal has been changed from the L level to the H level or not (S228). If the signal has not been switched, the processing returns to S227. If the signal has been switched, the processing proceeds to S212.

When the CPU 135 determines that the time Tt is at least the error detection time Terr in S227, the CPU 135 turns on the power supply VB to the ASIC 136, and performs processes of starting communications between the CPU 135 and the ASIC 136 and between the ASIC 136 and the image controller 127 in S229 to S241. The processes in S229 to S241 are identical to the processes S33 to S45 in FIG. 3B. Accordingly, the description thereof is omitted.

The communications are started between the CPU 135 and the ASIC 136 and between the ASIC 136 and the image controller 127, and the CPU 135 determines whether each communication can be performed or not (S242). If the CPU 135 determines that the communication can be performed, the CPU 135 determines that it is because of an error owing to the broken signal line for the WAKEUP-B signal (S243). When the CPU 135 determines in S242 that the communication cannot be performed, the CPU 135 determines that it is because of one of an error owing to the broken signal line for the WAKEUP-A signal and an error owing to a malfunction of the image controller 127 (S244). The CPU 135 switches the ASICRST signal from the H level to the L level, thereby resetting the ASIC 136 (S245). The CPU 135 stops the ASIC-CLK signal (S246), and switches the ASICOFF signal from the H level to the L level, thereby turning off the power supply to the ASIC 136 (S247). The CPU 135 does not perform the transition to the normal mode, but continues (maintains) the power-saving mode (S248). When the CPU 135 determines in one of S225 and S228 that the WAKEUP-B signal has been changed from the L level to the H level, the image controller 127 internally starts the process for transitioning to the normal mode (S212). Subsequently, processes S213 to S225 performed by one of the CPU 135 and the ASIC 136 are identical to the processes S33 to S45 in FIG. 3B. Accordingly, the description thereof is omitted.

Thus, the broken signal lines for the WAKEUP-A signal and the WAKEUP-B signal and the malfunction error of the image controller 127 can be detected by waiting the response from the WAKEUP-B signal after the WAKEUP-A signal has been changed from the L level to the H level. Further, when the malfunction occurs, the power-saving mode can be maintained without transition to the normal mode.

In the description in FIGS. 8A and 8B, it has been described that the WAKEUP-A signal and the WAKEUP-B signal are notified before waiting the startup of the power supply VB. The notification may be made responsive to completion of various preparation processes before the starting of communication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-230030, filed Oct. 1, 2009, which is hereby incorporated by reference herein in its entirety.

What is claimed is:

1. An image forming apparatus comprising:
    an image controller that performs processing of input image information;
    an engine controller into which a first processing part and a second processing part are combined, wherein the engine controller causes the second processing part to perform a communication regarding image formation with the image controller and controls operation of an image forming unit based on image information processed by the image controller;
    a power supply that supplies power to the engine controller, wherein a mode of the image forming apparatus is switchable from a first mode that is a state of image formation or a stand-by state, to a second mode whose power consumption is smaller than a power consumption of the first mode;
    a switch unit which switches between the first mode in which power is supplied to the second processing part from the power supply and the second mode in which power is not supplied to the second processing part from the power supply; and
    a communication line that transmits a notification regarding transition from the second mode to the first mode between the image controller and the first processing part,
    wherein the image controller and the first processing part communicate with each other through the second processing part in the first mode, or the image controller and the first processing part communicate with each other through the communication line but not through the second processing part in the second mode,
    wherein in the second mode, in a case where the first processing part receives a command of transition from the second mode to the first mode from the image controller through the communication line and sends back a response to the command to the image controller through the communication line, the first processing part controls the switch unit to start supplying power to the second processing part.

2. The image forming apparatus according to claim 1, wherein a notification of transition from the second mode to the first mode is transmitted through the communication line from the first processing part to the image controller.

3. The image forming apparatus according to claim 2, wherein the communication line is connected to an interrupt port of the first processing part.

4. The image forming apparatus according to claim 2, wherein the communication line is one signal line capable of bi-directionally communicating.

5. The image forming apparatus according to claim 1, wherein the image controller continues the second mode in a case where the first processing part does not transmit the notification to the image controller through the communication line after the image controller has transmitted the notification to the first processing part through the communication line.

6. The image forming apparatus according to claim 1, wherein the first processing part continues the second mode in a case where the image controller does not transmit the notification to the first processing part through the communication line after the first processing part has transmitted the notification to the image controller through the communication line.

7. The image forming apparatus according to claim 1, wherein the image forming unit comprises a thermal detector that detects a temperature of a fixing unit for fixing an image formed on a recording material,
    wherein the thermal detector receives power supplied by the power supply even when the supply power to the second processing part is stopped by the switch unit, and a signal detected by the thermal detector is input into the first processing part.

8. The image forming apparatus according to claim 1, wherein the first processing part is a CPU and the second processing part is an ASIC.

9. An image forming apparatus comprising:
an image controller that performs processing of input image information;
an engine controller into which a first processing part and a second processing part are combined, wherein the engine controller causes the second processing part to perform a communication regarding image formation with the image controller and controls operation of an image forming unit based on image information processed by the image controller; and
a power supply that supplies power to the engine controller, wherein a mode of the image forming apparatus is switchable from a first mode that is a state of image formation or a stand-by state, to a second mode whose power consumption is smaller than a power consumption of the first mode;
a switch unit which switches between the first mode in which power is supplied to the second processing part from the power supply and the second mode in which power is not supplied to the second processing part from the power supply; and
a communication line that transmits a notification regarding transition from the second mode to the first mode between the image controller and the first processing part,
wherein the image controller and the first processing part communicate with each other through the second processing part in the first mode, or the image controller and the first processing part communicate with each other through the communication line but not through the second processing part in the second mode,
wherein in the second mode, in a case where the first processing part sends a command of transition from the second mode to the first mode to the image controller through the communication line and receives a response to the command to the image controller through the communication line, the first processing part controls the switch unit to start supplying power to the second processing part.

10. The image forming apparatus according to claim 9, wherein the communication line is connected to an interrupt port of the first processing part.

11. The image forming apparatus according to claim 9, wherein the communication line is one signal line capable of bi-directionally communicating.

12. The image forming apparatus according to claim 9, wherein the first processing part continues the second mode in a case where the image controller does not transmit the notification to the first processing part through the communication line after the first processing part has transmitted the notification to the image controller through the communication line.

13. The image forming apparatus according to claim 9, wherein the image forming unit comprises a thermal detector that detects a temperature of a fixing unit for fixing an image formed on a recording material,
wherein the thermal detector receives power supplied by the power supply even when the supply power to the second processing part is stopped by the switch unit, and a signal detected by the thermal detector is input into the first processing part.

14. The image forming apparatus according to claim 9, wherein the first processing part is a CPU and the second processing part is an ASIC.

15. An image forming apparatus comprising:
a first control unit for executing processing of input image information;
a second control unit for controlling an operation of an image forming unit by communication with the first control unit;
a third control unit for controlling an operation of the image forming unit by communication with the second control unit; and
a communication line for communicating between the first and the third control units, wherein the first and the third control units communicate with each other through the second control unit in a first mode in which power is supplied to the first to the third control units, and the first and the third control units communicate with each other through the communication line but not through the second control unit in a second mode and power consumption of the second mode is less than a power consumption of the first mode, and
wherein in the second mode, in a case where the first control unit sends a command of transition from the second mode to the first mode to the third control unit through the communication line and the third control unit sends back a response to the command to the first control unit, or in a case where the third control unit sends a command of transition from the second mode to the first mode to the first control unit through the communication line and the first control unit sends back a response to the command to the third control unit, the first control unit or the third control unit switches a mode from the second mode to the first mode.

16. The image forming apparatus according to claim 15, wherein a power is not supplied to the second control unit in the second mode.

* * * * *